United States Patent
Dong et al.

(10) Patent No.: US 8,533,390 B2
(45) Date of Patent: Sep. 10, 2013

(54) CIRCULAR BUFFER IN A REDUNDANT VIRTUALIZATION ENVIRONMENT

(75) Inventors: Yao Zu Dong, Shanghai (CN); Kun Tian, Shanghai (CN); Yunhong Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 12/872,235

(22) Filed: Aug. 31, 2010

(65) Prior Publication Data

US 2012/0054408 A1 Mar. 1, 2012

(51) Int. Cl.
*G06F 12/00* (2006.01)

(52) U.S. Cl.
USPC .............................. 711/110; 711/6; 711/173

(58) Field of Classification Search
USPC .......................................................... 711/110
See application file for complete search history.

(56) References Cited

U.S. PATENT DOCUMENTS

| | | | |
|---|---|---|---|
| 5,584,038 A | | 12/1996 | Papworth et al. |
| 5,873,089 A | * | 2/1999 | Regache ............................ 1/1 |
| 6,032,179 A | * | 2/2000 | Osborne ....................... 709/213 |
| 6,131,113 A | * | 10/2000 | Ellsworth et al. ............. 709/213 |
| 6,148,365 A | * | 11/2000 | Buer ............................. 711/110 |
| 7,149,291 B1 | * | 12/2006 | Deshpande ............... 379/112.01 |
| 2002/0078317 A1 | * | 6/2002 | Yasoshima ..................... 711/171 |
| 2003/0145210 A1 | * | 7/2003 | Taylor ............................ 713/182 |
| 2004/0199732 A1 | * | 10/2004 | Kelley et al. ................... 711/158 |
| 2005/0283547 A1 | | 12/2005 | Parry et al. |
| 2007/0245074 A1 | * | 10/2007 | Rosenbluth et al. .......... 711/110 |
| 2008/0107396 A1 | | 5/2008 | Chung et al. |

FOREIGN PATENT DOCUMENTS

| | | |
|---|---|---|
| WO | 2012/030667 A2 | 3/2012 |
| WO | 2012/030667 A3 | 5/2012 |

OTHER PUBLICATIONS

International Search Report and Written Opinion for PCT Patent Application No. PCT/US2011/049442, mailed on Apr. 9, 2012, 8 pages.
International Preliminary Report on Patentability received for PCT Patent Application No. PCT/US2011/049442, mailed on Mar. 14, 2013, 5 pages.

* cited by examiner

*Primary Examiner* — Kaushikkumar Patel
(74) *Attorney, Agent, or Firm* — Thomas R. Lane

(57) ABSTRACT

Embodiments of systems, apparatuses, and methods for a circular buffer in a redundant virtualization environment are disclosed. In one embodiment, an apparatus includes a head indicator storage location, an outgoing tail indicator storage location, a buffer tail storage location, and fetch hardware. The head indicator, outgoing tail indicators, and buffer tail indicators are to indicate a head, outgoing tail, and buffer tail, respectively, of a circular buffer. The fetch hardware is to fetch from the head of the circular buffer and advance the head no further than the outgoing tail. The buffer tail is to be filled by software and advanced no further than the head.

19 Claims, 14 Drawing Sheets

METHOD 500

METHOD 600

METHOD 700

METHOD 1100

METHOD 1200

METHOD 1300

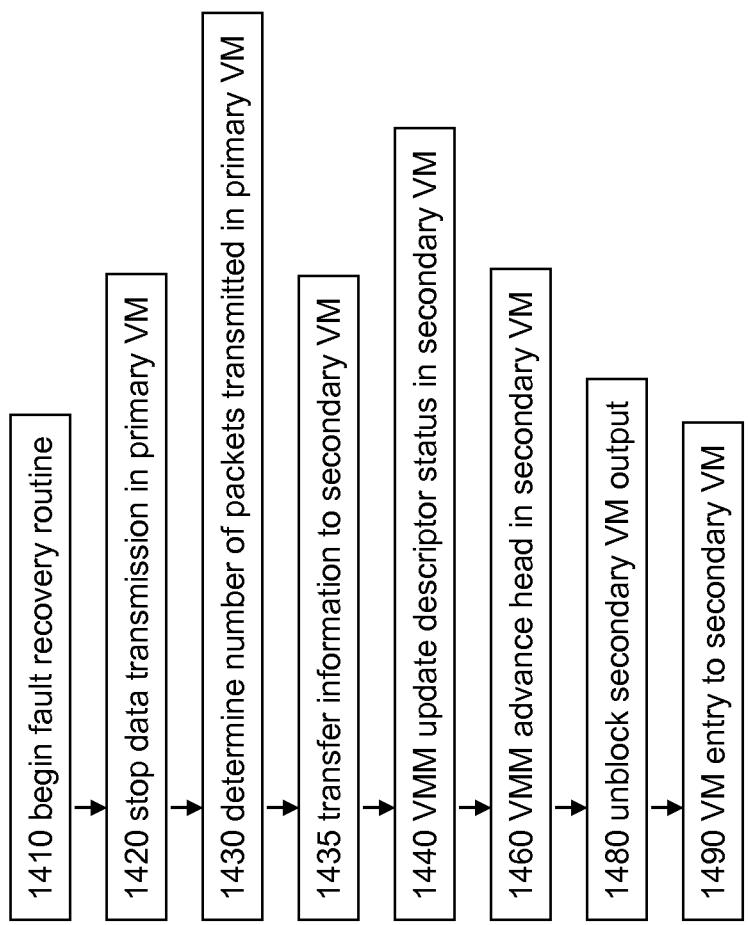

CIRCULAR BUFFER IN A REDUNDANT VIRTUALIZATION ENVIRONMENT

BACKGROUND

1. Field

The present disclosure pertains to the field of information processing, and more particularly, to the field of virtualization in information processing systems.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM may be referred to as a "guest" or as "guest" software.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies.

A physical resource in the system, such as an input/output device controller, may be assigned or allocated to a VM on a dedicated basis. Alternatively, a physical resource may be shared by multiple VMs, by intercepting all transactions involving the resource so that the VMM may perform, redirect, or restrict each transaction. A third approach may be to design the physical resource to provide the capability for it to be used as multiple virtual resources.

BRIEF DESCRIPTION OF THE FIGURES

The present invention is illustrated by way of example and not limitation in the accompanying figures.

FIGS. 10, 11, 12, 13, and 14 illustrate methods for using a circular buffer in a redundant virtualization environment according to embodiments of the present invention.

DETAILED DESCRIPTION

Figure 1:
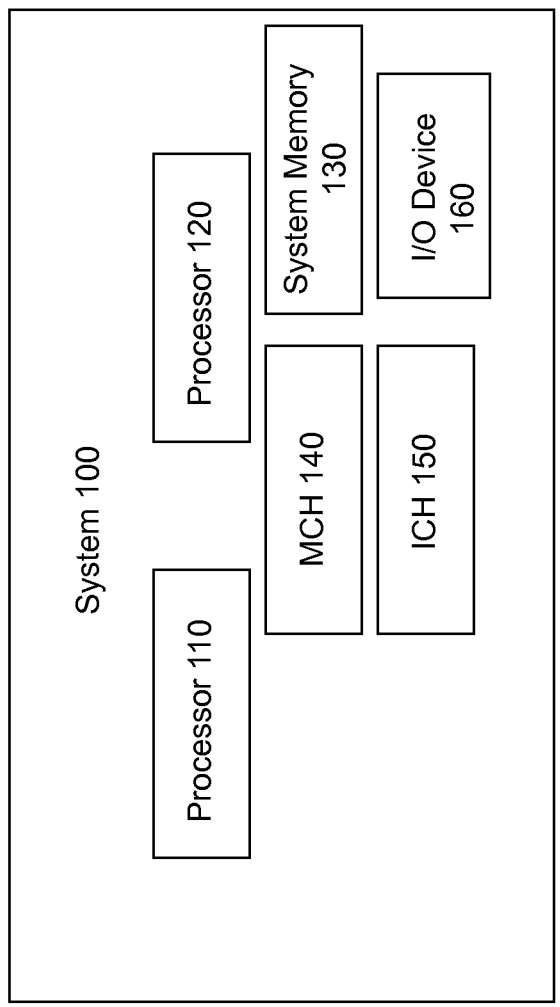
FIG. 1 illustrates an information processing system including a circular buffer according to an embodiment of the present invention.

Embodiments of systems, apparatuses, and methods, for a circular buffer in a redundant virtualization environment are described. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Embodiments of the present invention provide for a physical or a virtual resource, such as an I/O device controller, to be dedicated to a virtual machine in a redundant virtualization environment. A redundant virtualization environment is a virtualization environment in which the state of a first virtual machine (the "primary" or "active" VM) is replicated on a second virtual machine (the "secondary" or "backup" VM). Redundancy may be useful to provide a secondary VM in the event of a fault affecting the primary VM, and/or to provide for error checking of the outputs from the primary VM.

Redundancy may involve synchronizing the primary and secondary VMs at checkpoints. Between each checkpoint, the output and/or state changes of the primary VM are buffered, so that each checkpoint, the output and/or state changes of the primary VM may be compared with the output and/or state changes of the secondary VM, or saved in order to create the secondary VM if necessary. After receiving acknowledgement that the state changes based on the buffered output have been received and/or saved, the buffered output may be released. This synchronization may be performed by a VMM.

If the execution of the primary VM is deterministic, e.g., execution of arithmetic, memory, and branch instructions, the secondary VM may execute independently from the primary VM and produce the same output and reach the same state. However, if the execution of the primary VM is non-deterministic, e.g., handling of asynchronous events such as interrupts from I/O devices, the primary and secondary VMs may both execute correctly but with different outputs and/or reach a different state. Therefore, a "log and replay" technique may be used to generate an execution record or log that may be used to replay the execution of a primary VM on a secondary VM to identically replicate the output and the state of the primary VM, typically starting from a checkpoint, even when the execution is not entirely deterministic.

In some virtualization environments, an access by a VM to a system resource, such as an I/O device controller, is intercepted by the VMM (a "VM exit"), to virtualize the resource. In these virtualization environments, the VMM controls the transfer of data by the device; therefore, the VMM can control buffering of the output for checkpointing and can convert non-deterministic events in the hardware to deterministic events in the software for log and replay.

In other virtualization environments, a system resource may be dedicated to a VM (e.g., "direct I/O"). This technique may provide for more efficient virtualization, because the VM is able to access the system resource without causing a virtual machine exit that would consume many clock cycles for state saving operations. However, since the VMM does not control the transfer of data by the device, embodiments of the present invention may be desirable to provide for the buffering of the output for checkpointing and/or the deterministic operation of direct I/O for log and replay.

FIG. 1 illustrates an embodiment of the present invention in a system, specifically information processing system 100. Information processing system 100 may be any information processing apparatus capable of executing any software or firmware. For example, information processing system 100 may represent a personal computer, a mainframe computer, a server, a portable computer, a handheld device, or any other computing system. Information processing system 100 includes processors 110 and 120, system memory 130, memory control hub ("MCH") 140, I/O control hub ("ICH") 150, and I/O device 160. Processors 110 and 120, system memory 130, MCH 140, ICH 150, and I/O device 160 may be coupled to or communicate with each other according to any known approach, such as directly or indirectly through one or more buses, point-to-point, or other wired or wireless connections. Information processing system 100 may also include any number of additional components or connections. Furthermore, the components in information processing system 100 may be integrated or combined into any number of chips or packages. For example, MCH 140 may be integrated into a chip or package including one or both of processors 110 and 120.

Processors 110 and 120 may be any type of processor, including a general purpose microprocessor, such as a processor in the Intel® Pentium® Processor Family, Itanium® Processor Family, Core® Processor Family or other processor family from Intel® Corporation, or another processor from another company, or a digital signal processor or microcontroller. Processors 110 and 120 may each include multiple threads and multiple execution cores, in any combination. Although FIG. 1 shows two processors, information processing system 100 may include only a single processor or any number of processors.

System memory 130 may be static or dynamic random access memory, or any other type of medium readable by processors 110 and 120, or any combination of such mediums.

MCH 140 may include any logic, circuitry, or other hardware to control the transfer of information between system memory 130 and any other component in information processing system 100, such as processors 110 and 120. MCH 140 may also include any other logic, circuitry, or other hardware to perform any other functions, such as passing and/or translating transactions and/or other communications between ICH 150 and processors 110 and 120 and system memory 130.

ICH 150 may include logic, circuitry, or other hardware to manage system logic, peripherals, and I/O devices in information processing system 100, which may be integrated into ICH 150 and/or may communicate with ICH 150, and to control the transfer of information between these devices and any other component in information processing system 100, such processors 110 and 120 and system memory 130. ICH 150 may also include any other logic, circuitry, or other hardware to perform any other functions, such as passing and/or translating transactions and/or other communications between MCH 140 and any peripherals, I/O devices, or other components in information processing system 100.

I/O device 160 may represent any I/O or peripheral device and/or a controller or adapter for any such device. I/O device 160 may be integrated into or separate from ICH 150. I/O device 160 may support I/O virtualization; for example, I/O device 160 may include or provide a physical function ("PF") that may be controlled by a VMM, and one or more virtual functions (each a "VF"), where the VMM may configure and manage the physical resources of I/O device 160 such that each of the VFs may be controlled and/or accessed directly by a VM. Therefore, a VF supported by I/O device and assigned to a VM may transfer data within, into, or out of system 100, under control of the VM, without the intervention of a VMM. In one embodiment, I/O device 160 may be a network interface controller ("NIC"). In another embodiment, I/O device 160 may be a disk drive controller.

Figure 2:
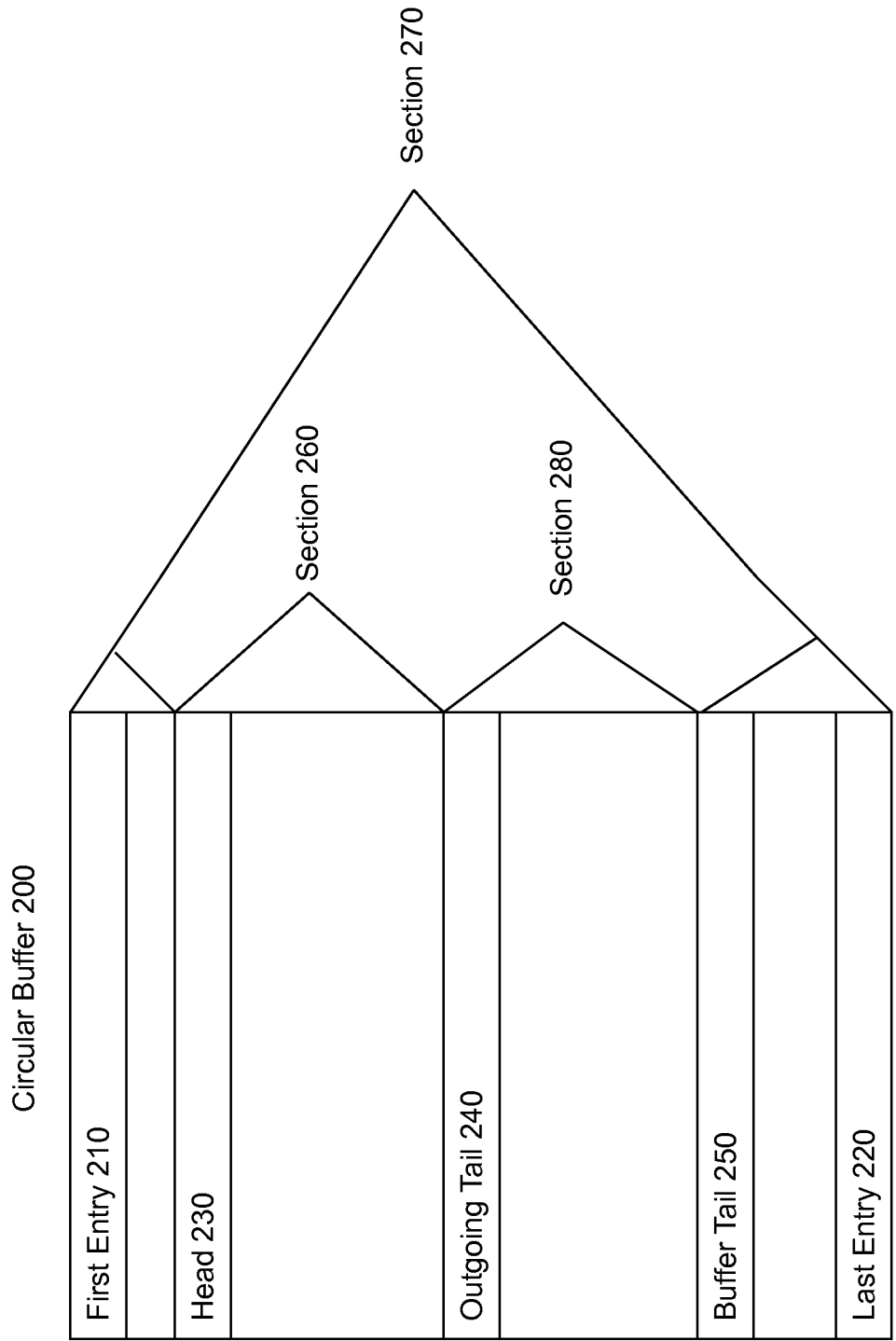
FIG. 2 illustrates a two-tailed circular buffer according to an embodiment of the present invention.

I/O device 160 may be capable of transferring data to and from system memory 130 and/or other memory in or accessible to information processing system 100, through direct memory access ("DMA"). I/O device 160 may include five registers or other storage locations, described below, which may be used to define a circular buffer, such as circular buffer 200 illustrated in FIG. 2. Circular buffer 200 may include entries to identify data or the location of data to be transmitted and/or received by I/O device 160. The entries may be implemented using physical storage locations in I/O device 160, in system memory 130 (e.g., in a region allocated to I/O device 160), or elsewhere in or accessible to information processing system 100, or any combination of such physical storage locations. Each entry may be of any desired size.

For example, in an embodiment where I/O device 160 represents a virtual NIC controlled by a VM, the VM may set up I/O device 160 to use circular buffer 200 to receive data from the network, and transfer the data, without intervention by a VMM or processor 110 or 120, to a region of system memory 130 allocated to the VM. Similarly, the VM may set up I/O device 160 to use circular buffer 200 to transfer data from a region of system memory 130 allocated to the VM, and transmit the data onto the network, without intervention by a VMM or processor 110 or 120. Circular buffer 200 may include any number of entries, where each entry may be used to store a descriptor to identify data to be transferred.

Figure 3:
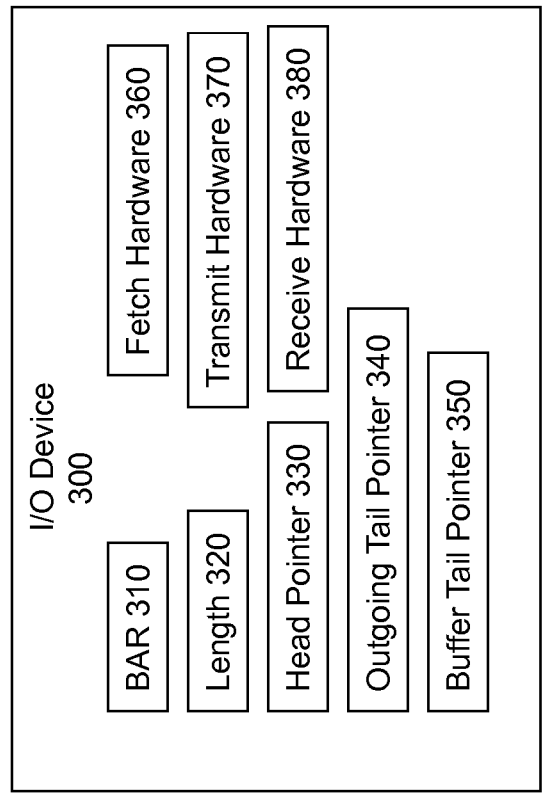
FIG. 3 illustrates an input/output device for use in an embodiment of the present invention.

FIG. 3 illustrates I/O device 300 which may represent I/O device 160 in an embodiment of the present invention. I/O device 300 may include fetch hardware 360 to fetch descriptors or other information from circular buffer 200, e.g., for transmitting data onto a network. Fetch hardware 360 may include any circuitry or other structures configured to fetch descriptors from circular buffer 200, as described in this specification. I/O device 300 may also include transmit hardware 370 to transmit data, including the data corresponding to the descriptors fetched from circular buffer 200 (e.g., in an embodiment where buffer 200 is a transmit buffer), for example, onto a network. Furthermore, I/O device 300 may include receive hardware 380 to receive data, for example, from a network. The received data may be used in connection with filling a second circular buffer (e.g., a receive buffer) in I/O device 300.

In I/O device 300, the five registers or other storage locations used to define circular buffer 200 are base address register 310, length register 320, head pointer register 330, outgoing tail pointer register 340, and buffer tail pointer register 350 to identify the base address, length, head, outgoing tail, and buffer tail, respectively, of circular buffer 200, using any known technique of addressing or direct or indirect referencing. These storage locations may be programmed by software, such as a device driver running on a VMM and/or a VM to which a virtual NIC supported by I/O device 300 is allocated.

For example, the location and size of circular buffer 200 may be defined by the values in base address register 310 and length register 320, respectively, i.e., the location of first entry 210 in circular buffer 200 may be defined by the base address and the location of last entry 220 in circular buffer 200 may be defined by the base address plus the length. Circular buffer 200 may be used to create an endless queue by starting to fill the buffer at first entry 210 and continuing to fill entries consecutively towards last entry 220. After last entry 220 is filled, the queue wraps around to first entry 210 to be filled again and continues towards last entry 220 again. Fetching entries from circular buffer 200 proceeds in the same manner, such that the descriptor in an entry is fetched before the entry is filled with another descriptor.

The filling of and fetching from circular buffer 200 may be managed using head 230, outgoing tail 240, and buffer tail 250 to ensure that the descriptor in an entry is fetched before the entry is filled with a different descriptor, and also to provide for buffering of the output of I/O device 300 to support a redundant virtualization environment. Circular buffer 200 is filled by software and fetched from by hardware, as further described below. Filling any one particular entry with a descriptor occurs before fetching that descriptor from that particular, but for convenience, the fetch hardware is described first.

Fetch hardware 360 is configured to fetch from circular buffer 200 by fetching from the entry at head 230, advancing head 230 to the next consecutive entry, and repeating the fetch from head 230 and the advancing of head 230 until head 230 reaches outgoing tail 240. Therefore, in an embodiment where circular buffer 200 is used for a transmit queue of a NIC, hardware owns the entries in section 260 of circular buffer 200 (the entries starting at head 230 and ending at the entry immediately before outgoing tail 240), and hardware is to fetch the descriptors from these entries and transmit the data corresponding to these entries.

Buffer tail 250 is provided as the location at which software (e.g., a device driver running in the VM to which a VF supported by I/O device 300 is assigned) is to fill circular buffer 200, then advance buffer tail 250 to the next consecutive entry, and continue filling if desired, until buffer tail 250 reaches head 230. Therefore, software (e.g., a device driver running in a VM) owns the entries in section 270 of circular buffer 200 (starting at buffer tail 250 and ending at the entry immediately before head 230), and may store descriptors in these entries.

Outgoing tail 240 is provided to define a section of circular buffer 200 in which output may be buffered to support a redundant virtualization environment. The entries in section 280 of circular buffer 200 (starting at outgoing tail 240 and ending at the entry immediately before buffer tail 250) are filled, but are not available for hardware to transmit because they are not in section 260 of circular buffer 200. These entries are owned by software, but unlike the entries in section 270 of circular buffer 200, are not available to be filled by a device driver running in a VM. Instead, section 280 of circular buffer 200 is owned by VMM software, to provide for a VMM to buffer the output of I/O device 300 even when the output of I/O device 300 is for a VF dedicated to a primary VM. These entries remain stored until the primary VM is intercepted by the VMM, at which time the VMM may synchronize the secondary VM with the primary VM, and then release these entries by advancing outgoing tail 240 to buffer tail 250. These interceptions may occur at checkpoints or any other points at which VM exits occur, but need not occur every time I/O device 300 transmits data from a VM, as may be necessary in a redundant virtualization environment not including an embodiment of the present invention.

FIGS. 4, 5, 6, and 7 illustrate embodiments of the present invention in methods 400, 500, 600, and 700, methods for using a two-tailed circular buffer in a redundant virtualization environment. In the following descriptions of methods 400, 500, 600, and 700, references may be made to elements of FIGS. 1, 2, and 3; however, method embodiments of the present invention are not limited in this respect.

Figure 4:
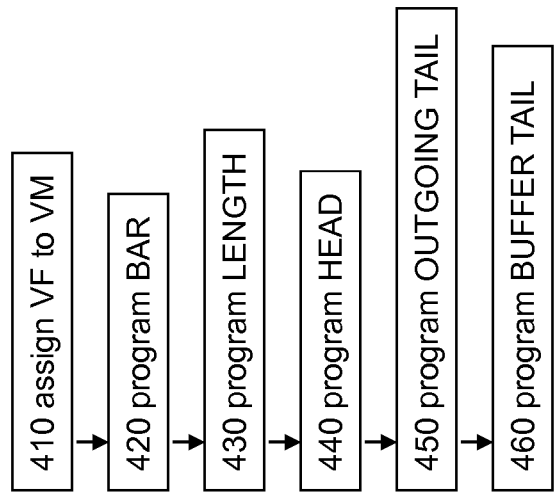
FIGS. 4, 5, 6, and 7 illustrate methods for using a two-tailed circular buffer in a redundant virtualization environment according to embodiments of the present invention.

In box 410 of FIG. 4, a VF such as an NIC function of an I/O device, including a circular buffer, may be assigned to a primary VM, for example, by configuration of the PF of the I/O device by a VMM.

In box 420, the base address register for the circular buffer may be programmed. In box 430, the length register for the circular buffer may be programmed. In box 440, the head pointer register for the circular buffer may be programmed with the base address. In box 450, the outgoing tail pointer register for the circular buffer may be programmed with the base address. In box 460, the buffer tail pointer register for the circular buffer may be programmed with the base address. From box 460, method 400 may proceed to method 500.

Figure 5:
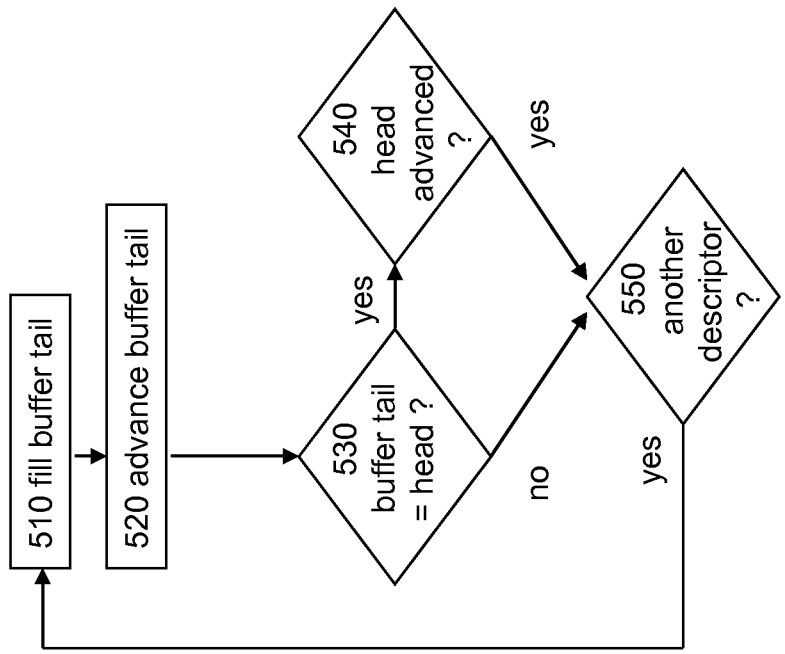
Figure 6:
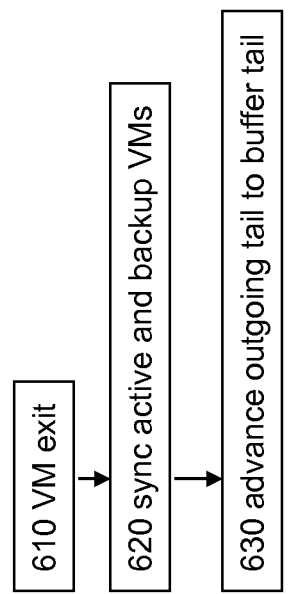
Figure 7:
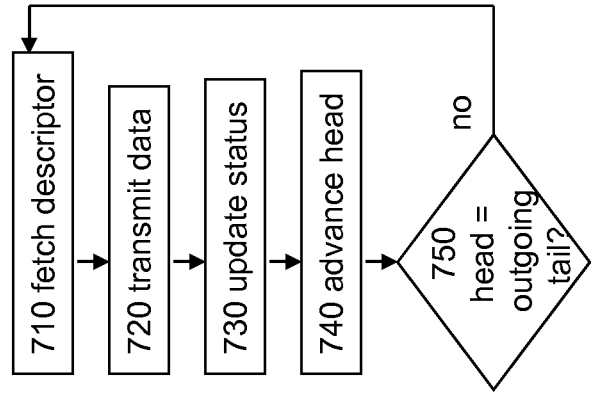

In box 510 of FIG. 5, a device driver running in the primary VM fills an entry at the buffer tail of the circular buffer with a descriptor. In box 520, the device driver advances the buffer tail to the next consecutive entry. In box 530, a determination is made as to whether the buffer tail has reached the head of the circular buffer. If yes, then method 500 waits in box 540 until the head of the circular buffer is advanced in method 700. If no, then in box 550, a determination is made as to whether another entry is to be filled with a descriptor. If yes, then method 500 returns to box 510. If no, then method 500 waits in box 550.

Method 600 may be entered when a VM exit occurs in box 610. In box 620, the VMM synchronizes a secondary VM with the primary VM. The descriptors in the entries starting at the outgoing tail and ending at the entry immediately before the buffer tail may be used and/or updated in connection with this synchronization. In box 630, the VMM advances the outgoing tail to the buffer tail, thereby releasing the output represented by the entries referred to in box 520.

Method 700 may begin any time after the first time the device driver advances the buffer tail in box 520. In box 710, fetch hardware in the I/O device fetches a descriptor from the entry at the head of the circular buffer. In box 720, the I/O device transmits data according to the fetched descriptor. In box 730, the fetch hardware updates the fetched descriptor status to indicate that the corresponding data has been transmitted. In box 740, the fetch hardware advances the head to the next consecutive entry. In box 750, a determination is made as to whether the head has reached the outgoing tail of the circular buffer. If yes, then method 700 waits in box 750 until the outgoing tail of the circular buffer is advanced in method 600. If no, method 700 returns to box 710.

Within the scope of the present invention, the methods illustrated in FIGS. 4, 5, 6, and 7 and/or the actions taken in performing methods 400, 500, 600, and 700 may be performed together or separately, in a different order, with illustrated boxes omitted, with additional boxes added, or with a combination of reordered, omitted, or additional boxes.

Furthermore, other embodiments of the present invention are possible. In one embodiment, a programmable bit or flag may be used to provide for backward compatibility. For example, when the flag is set, the circular buffer hardware will operate as described above, but when the flag is clear, the circular buffer hardware will automatically synchronize the outgoing tail with the buffer tail every time the buffer tail is changed by software. In another embodiment, dirty bits may be used by an I/O memory management unit to mark DMA input pages that have changed since the last checkpoint, so that the inputs to a primary VM may be synchronized with a secondary VM.

Figure 8:
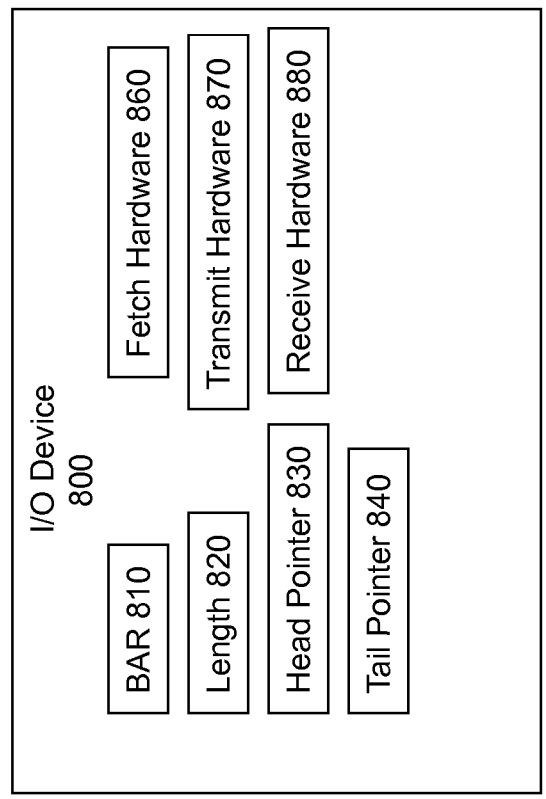
FIG. 8 illustrates an input/output device for use in an embodiment of the present invention.
Figure 9:
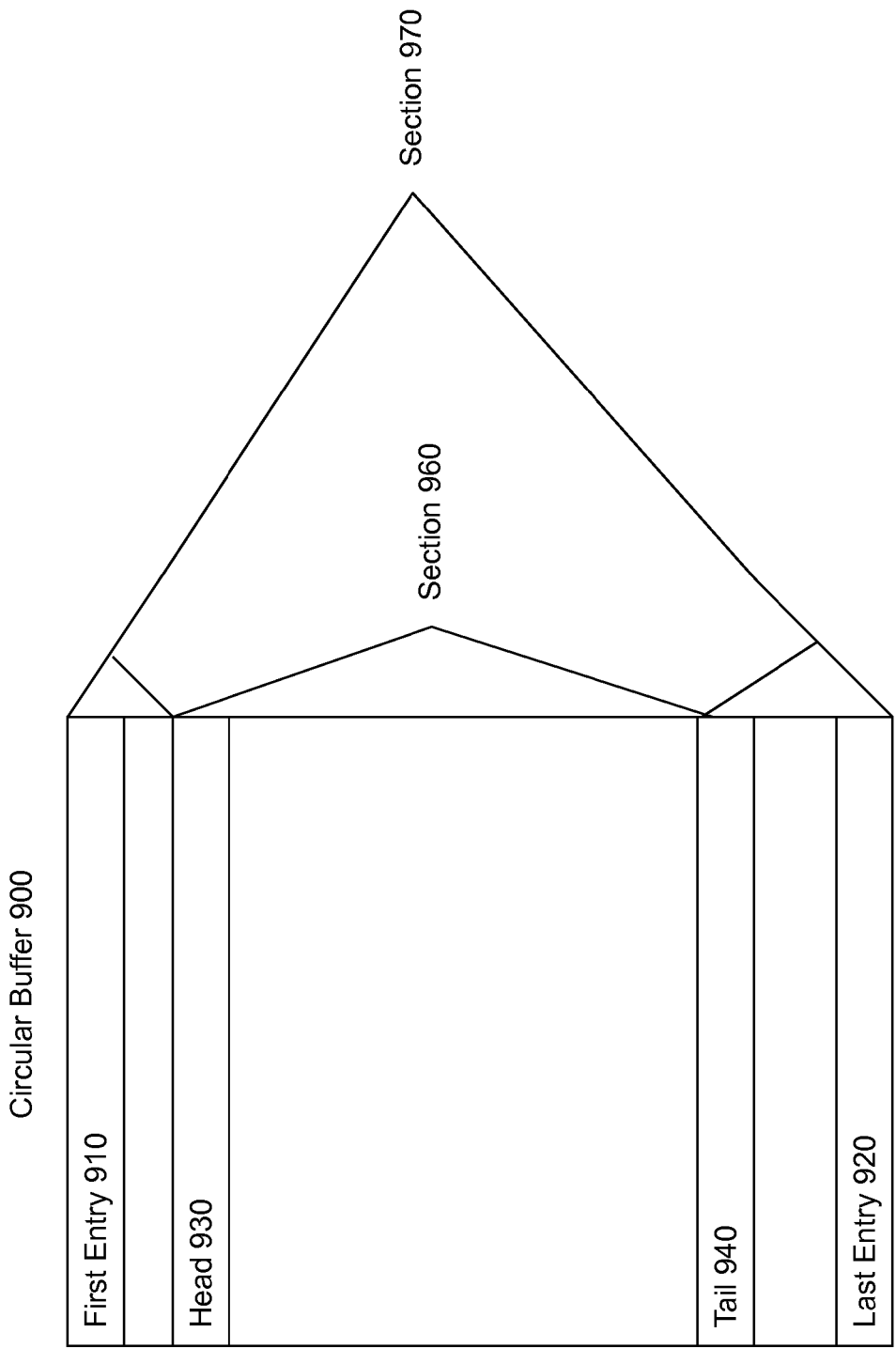
FIG. 9 illustrates a circular buffer according to an embodiment of the present invention.

FIGS. 8 and 9 illustrate I/O device 800 and circular buffer 900, respectively, for use in another embodiment of the present invention. I/O device 800 may include fetch hardware 860 to fetch descriptors or other information from circular buffer 900, e.g., for transmitting data onto a network. Fetch hardware 860 may include any circuitry or other structures configured to fetch descriptors from circular buffer 900, as described in this specification. I/O device 800 may also include transmit hardware 870 to transmit data, including the data corresponding to the descriptors fetched from circular buffer 900 (e.g., in an embodiment where buffer 900 is a transmit buffer), for example, onto a network. Furthermore, I/O device 800 may include receive hardware 880 to receive data, for example, from a network. The received data may be used in connection with filling a second circular buffer (e.g., a receive buffer) in I/O device 800.

I/O device 800 may include four registers or other storage locations to define circular buffer 900. The four registers are base address register 810, length register 820, head pointer register 830, and tail pointer register 840 to identify the base address, length, head, and tail, respectively, of circular buffer 900, using any known technique of addressing or direct or indirect referencing. These storage locations may be programmed by software, such as a device driver running on a VMM and/or a VM to which a virtual NIC supported by I/O device 800 is allocated.

For example, the location and size of circular buffer 900 may be defined by the values in base address register 810 and length register 820, respectively, i.e., the location of first entry 910 in circular buffer 900 may be defined by the base address and the location of last entry 920 in circular buffer 900 may be defined by the base address plus the length. Circular buffer 900 may be used to create an endless queue by starting to fill the buffer at first entry 910 and continuing to fill entries consecutively towards last entry 920. After last entry 920 is filled, the queue wraps around to first entry 910 to be filled again and continues towards last entry 920 again. Fetching entries from circular buffer 900 proceeds in the same manner, such that the descriptor in an entry is fetched before the entry is filled with another descriptor.

The filling of and fetching from circular buffer 900 may be managed using head 930 and tail 940 to ensure that the descriptor in an entry is fetched before the entry is filled with a different descriptor. Circular buffer 900 is filled by software and fetched from by hardware, as further described below. Filling any one particular entry with a descriptor occurs before fetching that descriptor from that particular, but for convenience, the fetch hardware is described first.

Fetch hardware 860 is configured to fetch from circular buffer 900 by fetching from the entry at head 930, advancing head 930 to the next consecutive entry, and repeating the fetch from head 930 and the advancing of head 930 until head 930 reaches tail 940. Therefore, in an embodiment where circular buffer 900 is used for a transmit queue of a NIC, hardware owns the entries in section 960 of circular buffer 900 (the entries starting at head 930 and ending at the entry immediately before tail 940), and hardware is to fetch the descriptors from these entries and transmit the data corresponding to these entries.

Tail 940 is provided as the location at which software (e.g., a device driver running in the VM to which a VF supported by I/O device 800 is assigned) is to fill circular buffer 900, then advance outgoing 940 to the next consecutive entry, and continue filling if desired, until tail 940 reaches head 930. Therefore, software (e.g., a device driver running in a VM) owns the entries in section 970 of circular buffer 800 (starting at tail 940 and ending at the entry immediately before head 930), and may store descriptors in these entries.

FIGS. 10, 11, 12, 13, and 14 illustrate embodiments of the present invention in methods 1000, 1100, 1200, 1300, and 1400, methods for using a circular buffer for deterministic direct I/O in a redundant virtualization environment. In the following descriptions of methods 1000, 1100, 1200, 1300, and 1400, references may be made to elements of FIGS. 1, 8, and 9; however, method embodiments of the present invention are not limited in this respect.

Figure 10:
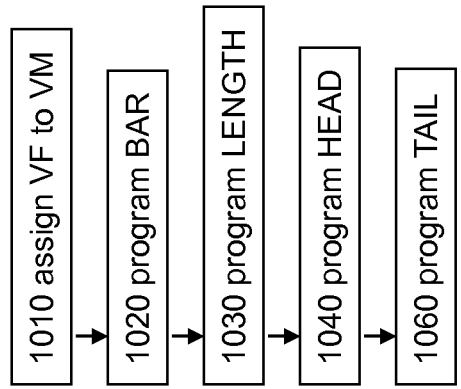

In box 1010 of FIG. 10, a VF such as an NIC function of an I/O device, including a circular buffer, may be assigned to a primary VM, for example, by configuration of the PF of the I/O device by a VMM.

In box 1020, the base address register for the circular buffer may be programmed. In box 1030, the length register for the circular buffer may be programmed. In box 1040, the head pointer register for the circular buffer may be programmed with the base address. In box 1060, the tail pointer register for the circular buffer may be programmed with the base address. From box 1060, method 1000 may proceed to method 1100.

Figure 11:
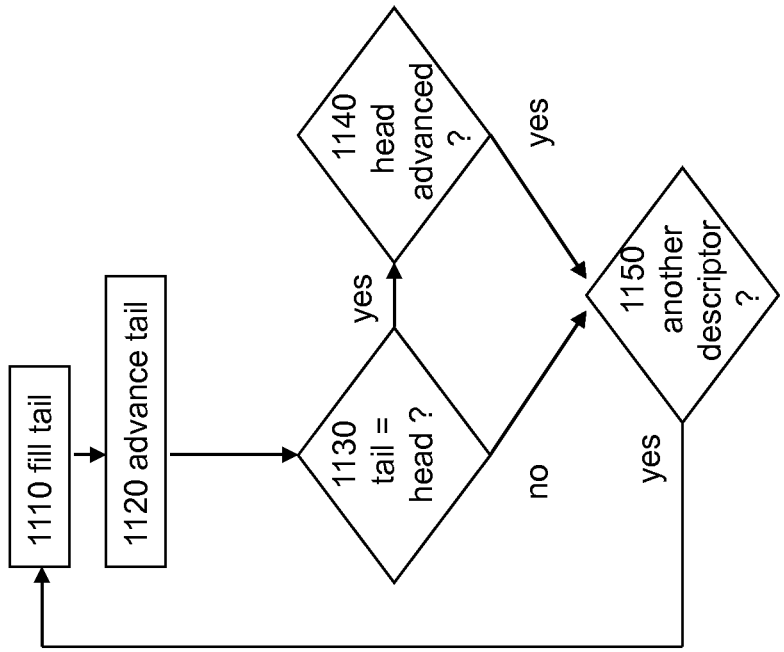
Figure 12:
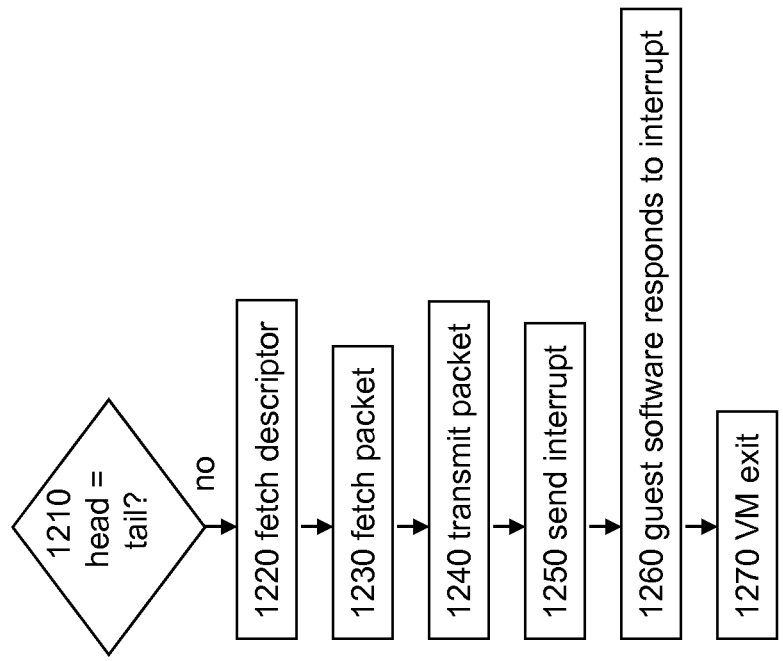
Figure 13:
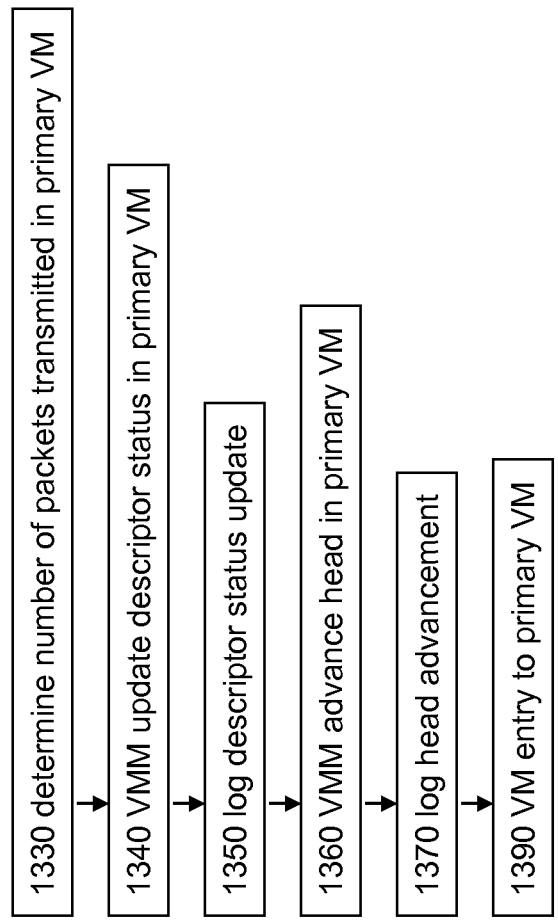

In box 1110 of FIG. 11, a device driver running in the primary VM fills an entry at the tail of the circular buffer with a descriptor. In box 1120, the device driver advances the tail to the next consecutive entry. In box 1130, a determination is made as to whether the tail has reached the head of the circular buffer. If yes, then method 1100 waits in box 1140 until the head of the circular buffer is advanced in method 1200. If no, then in box 1150, a determination is made as to whether another entry is to be filled with a descriptor. If yes, then method 1100 returns to box 1110. If no, then method 1100 waits in box 1150.

Method 1200 may begin in the primary VM any time after the first time the device driver advances the tail in box 1120. In box 1210, a determination is made, for example by fetch hardware in the I/O device, as to whether the head has matches the tail of the circular buffer. If yes, then method 1200 waits in box 1210 until the tail of the circular buffer is advanced in method 1100. If no, method 1200 proceeds to box 1220.

In box 1220, fetch hardware in the I/O device fetches a descriptor from an entry in the circular buffer. In box 1230, fetch hardware in the I/O device fetches a packet of data corresponding to the fetched descriptor. In box 1240, the I/O device transmits the packet. In one embodiment, boxes 1220, 1230, and 1240 may be repeated, starting from the head of the circular buffer and proceeding towards the tail, and ending no further than the entry immediately before the tail. In box 1250, the I/O device indicates that the data transmission in complete, for example by sending an interrupt signal or interrupt message to one or more processors.

In box 1260, guest software, for example an interrupt handler and/or a device driver for the I/O device, runs in the primary VM in response to the indication from box 1250. In box 1270, a VM exit occurs in response to the indication from box 1250 and/or the execution of guest software in box 1260, for example, in response to a hypercall or other instruction or operation issued and/or executed by or for the guest software, and control is transferred to a VMM in method 1300.

Note that methods 1000, 1100, and 1200 may also be performed in a secondary VM. In one embodiment the secondary VM may operate in parallel with the primary VM. The input stream to the primary VM may be replicated to be input to the secondary VM. However, the output from the secondary VM may be blocked or otherwise suppressed to prevent a conflict between the secondary VM and the primary VM.

In box 1330, the VMM determines how many packets of data have been transmitted by the primary VM. In one embodiment, the VMM may determine how many packets have been transmitted using an application programming interface ("API") developed for use according to an embodiment of the present invention. In box 1340, the VMM updates the fetched descriptor status in the primary VM for each of the transmitted packets. In one embodiment, the VMM may perform box 1340 using an API developed for use according to an embodiment of the present invention. In box 1350, the update to the fetched descriptor status is logged in an execution log maintained by the VMM or other software. In box 1360, the VMM advances the head in the primary VM by the number of entries for which data has been transferred, e.g., by the number of packets that have been transmitted as determined in box 1330. In one embodiment, the VMM may perform box 1360 using an API developed for use according to an embodiment of the present invention. In box 1370, the advancement of the head is logged in an execution log maintained by the VMM or other software. In box 1390, the VMM transfers control to guest software running in the primary VM (i.e., a VM entry).

Note that since boxes 1340 and 1360 are performed by a VMM instead of by hardware in the I/O device, the execution of boxes 1340 and 1360 is deterministic because the point in the execution stream that changes are made to the fetched descriptor status and to the head pointer can be determined. Therefore, embodiments of the present invention provide for deterministic direct I/O, and changes to the fetched descriptor status and to the head pointer may be accurately logged and replayed.

Any time a failure occurs involving the operation of the primary VM, the secondary VM may be used to recover, for example, according to method 1400 illustrated in FIG. 14. In box 1410, the VMM or other software may begin to execute a fault recovery routine. In box 1420, the VMM may use an API to stop the transmission of data by the I/O device assigned directly to the primary VM. In box 1430, the VMM may use the API used in box 1330 to determine how many packets, if any, have been transmitted by the primary VM since the last synchronization. In box 1435, the information needed to replicate the primary VM on the secondary VM is transferred, if necessary, for example from the system hosting the primary VM or wherever the information is backed-up, to the system hosting the secondary VM. In box 1440, the VMM may use the API used in box 1340 to update the fetched descriptor status in the secondary VM for each of the transmitted packets. In box 1460, the VMM may use the API used in box 1360 to advance the head in the secondary VM. In box 1480, the VMM may unblock the output from the secondary VM to allow the secondary VM to replace the primary VM. In box 1490, the VMM transfers control to guest software running in the secondary VM (i.e., a VM entry).

Within the scope of the present invention, the methods illustrated in FIGS. 10, 11, 12, 13, and/or 14, and/or the actions taken in performing methods 1000, 1100, 1200, 1300, and/or 1400 may be performed together or separately, in a different order, with illustrated boxes omitted, with additional boxes added, or with a combination of reordered, omitted, or additional boxes. As one example, one or more of the APIs described above may be combined.

Furthermore, other embodiments of the present invention are possible. In one embodiment, a programmable bit or flag may be used to provide for backward compatibility. For example, when the flag is set, the circular buffer hardware will operate as described above, but when the flag is clear, the circular buffer hardware will operate according to an approach in which hardware performs the changes to the fetched descriptor status and to the head pointer.

Thus, embodiments of systems, apparatuses, and methods for a circular buffer in a redundant virtualization environment have been described. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
   a head indicator storage location configured to store a head indicator, the head indicator to indicate a head of a circular buffer;
   an outgoing tail indicator storage location configured to store a first tail indicator, the first tail indicator to indicate an outgoing tail of the circular buffer;
   fetch hardware configured to fetch from the head of the circular buffer and advance the head of the circular buffer no further than the outgoing tail of the circular buffer; and
   a buffer tail indicator storage location configured to store a buffer tail indicator, the buffer tail indicator to indicate a buffer tail of the circular buffer, the buffer tail of the circular buffer to be filled by software and advanced no further than the head of the circular buffer.

2. The apparatus of claim 1, wherein the head indicator is a head pointer, the outgoing tail indicator is an outgoing tail pointer, and the buffer tail indicator is a buffer tail pointer.

3. The apparatus of claim 2, wherein the head indicator storage location is a head pointer register, the outgoing tail indicator storage location is an outgoing tail pointer register, and the buffer tail indicator storage location is a buffer tail pointer register.

4. The apparatus of claim 3, further comprising a base address register configured to store a base address for the circular buffer.

5. The apparatus of claim 1, wherein the circular buffer includes a plurality of entries, each entry of the plurality of entries to store one of a plurality of direct memory address descriptors.

6. The apparatus of claim 5, further comprising transmit logic configured to transmit data corresponding to the direct memory address descriptors.

7. The apparatus of claim 6, wherein the transmit logic is configured to transmit the data onto a network.

8. A method comprising:
   filling, by first software, a circular buffer, starting at a buffer tail and advancing no further than a head;
   advancing, by second software, an outgoing tail to the buffer tail; and
   fetching, by hardware, from the circular buffer, starting at the head and advancing no further than the outgoing tail.

9. The method of claim 8, wherein the first software is guest software running on a primary virtual machine and the second software is a virtual machine monitor.

10. The method of claim 9, further comprising synchronizing, by the virtual machine monitor, the primary virtual machine and a secondary virtual machine before advancing the outgoing tail to the buffer tail.

11. The method of claim 10, wherein synchronizing includes reading from the circular buffer starting at the outgoing tail and ending at the entry immediately before the buffer tail.

12. The method of claim 8, wherein fetching further comprises fetching a plurality of direct memory address descriptors.

13. The method of claim 12, further comprising transmitting data corresponding to the plurality of direct memory address descriptors.

14. The method of claim 13, wherein transmitting data further comprises transmitting data to a network.

15. A system comprising:
- an input/output device configured to provide a physical function and a virtual function, the input output device including:
- a head indicator storage location configured to store a head indicator, the head indicator to indicate a head of a circular buffer,
- an outgoing tail indicator storage location configured to store a first tail indicator, the first tail indicator to indicate an outgoing tail of the circular buffer,
- fetch hardware configured to fetch from the head of the circular buffer and advance the head of the circular buffer no further than the outgoing tail of the circular buffer, and
- a buffer tail indicator storage location configured to store a buffer tail indicator, the buffer tail indicator to indicate a buffer tail of the circular buffer, the buffer tail of the circular buffer to be filled by guest software and advanced no further than the head of the circular buffer; and
- a processor configured to execute the guest software on a primary virtual machine and to execute a virtual machine monitor to prevent the guest software from accessing the physical function.

16. The system of claim 15, wherein the virtual machine monitor is also configured to advance the outgoing tail to the buffer tail after synchronizing the primary virtual machine and a secondary virtual machine.

17. The system of claim 15, wherein the circular buffer includes a plurality of entries, each entry of the plurality of entries configured to store one of a plurality of direct memory address descriptors.

18. The system of claim 17, wherein the input/output device further comprises transmit hardware configured to transmit data corresponding to the plurality of direct memory address descriptors.

19. The system of claim 15, wherein the physical function is a network interface controller.

\* \* \* \* \*